(12) United States Patent
Goss

(10) Patent No.: US 11,067,393 B2
(45) Date of Patent: Jul. 20, 2021

(54) METHOD FOR DETERMINING SHAPE DEVIATIONS OF A SURFACE, SURFACE EVALUATION SYSTEM, AND COMPUTER PROGRAM PRODUCT

(71) Applicant: Bayerische Motoren Werke Aktiengesellschaft, Munich (DE)

(72) Inventor: Andreas Goss, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 385 days.

(21) Appl. No.: 16/168,430

(22) Filed: Oct. 23, 2018

(65) Prior Publication Data

US 2019/0056222 A1 Feb. 21, 2019

Related U.S. Application Data

(63) Continuation of application No. PCT/EP2017/056191, filed on Mar. 16, 2017.

(30) Foreign Application Priority Data

Apr. 29, 2016 (DE) .......................... 102016207342.7

(51) Int. Cl.
*G01B 21/30* (2006.01)
*G01B 5/00* (2006.01)
(Continued)

(52) U.S. Cl.
CPC ............. *G01B 21/30* (2013.01); *G01B 5/003* (2013.01); *G01B 21/04* (2013.01); *G06F 16/904* (2019.01); *G06F 16/9024* (2019.01)

(58) Field of Classification Search
None
See application file for complete search history.

(56) References Cited

U.S. PATENT DOCUMENTS 8,596,807 B2 * 12/2013 Jeong ................ G02F 1/133605
362/97.2
2005/0049823 A1 3/2005 Link et al.
(Continued)

FOREIGN PATENT DOCUMENTS

CN 1373048 * 10/2002 ............. B41N 3/034
CN 1099856 C * 1/2003 ............. A46B 9/028
(Continued)

OTHER PUBLICATIONS

PCT/EP2017/056191, International Search Report dated May 17, 2017 (Three (3) pages).
(Continued)

*Primary Examiner* — Tung S Lau
(74) *Attorney, Agent, or Firm* — Crowell & Moring LLP

(57) ABSTRACT

A method for determining shape deviations of a real actual surface on the basis of measured vertical information of measurement points of the actual surface section is provided. Measurement points are located in a measurement-point extent section, wherein the method uses evaluation sections, which are arranged at offsets to each other and, altogether, extend over the measurement-point extent section. The method includes (a) for each measurement point of a number of measurement points of each evaluation section of the first evaluation sections, determining a maximum vertical distance that results as the greatest distance in a specified vertical direction between two measurement points, and (b) determining an evaluation-section slope, which represents a straight connecting line between an evaluation-section lowest point and an evaluation-section highest point, wherein, in a further step, the value pairs of a maximum vertical distance and of an evaluation-section slope, which value pairs are determined in a plurality of (Continued)

iterations for the respective evaluation sections thereof, are associated with a limit criterion.

20 Claims, 3 Drawing Sheets

(51) Int. Cl.
G06F 16/904 (2019.01)
G06F 16/901 (2019.01)
G01B 21/04 (2006.01)

(56) References Cited

U.S. PATENT DOCUMENTS

| | | | |
|---|---|---|---|
| 2009/0093976 A1 | 4/2009 | Vergnes et al. | |
| 2009/0116697 A1 | 5/2009 | Shalaby et al. | |
| 2012/0250293 A1* | 10/2012 | Jeong | G02F 1/133615 362/97.2 |

FOREIGN PATENT DOCUMENTS

| | | | | |
|---|---|---|---|---|
| CN | 1693967 A | * | 1/2005 | ......... G02F 1/13357 |
| CN | 1975620 | * | 6/2007 | ............... H04R 5/02 |
| CN | 100419378 | * | 9/2008 | ............. G01B 21/20 |
| CN | 100476883 C | * | 4/2009 | ............. G06T 17/00 |
| CN | 100573132 | * | 12/2009 | ............. G01N 27/80 |
| CN | 102089043 | * | 6/2011 | ......... A63B 53/0466 |
| CN | 102521476 | * | 6/2012 | ............. G06F 19/00 |
| CN | 103209829 A | * | 7/2013 | ............. B32B 5/145 |
| CN | 103993587 | * | 8/2014 | ............. Y02E 10/30 |
| CN | 103993587 A | * | 8/2014 | ............. Y02E 10/30 |
| CN | 104043203 A | * | 9/2014 | ............... A61N 5/10 |
| DE | 102 58 493 A1 | | 7/2004 | |
| DE | 10 2006 015 627 A1 | | 10/2007 | |
| DE | 10 2011 051 800 B3 | | 7/2012 | |
| DE | 10 2015 210 619 A1 | | 12/2015 | |
| FR | 2805471 | * | 8/2001 | ............. A63C 5/052 |
| WO | WO 8904497 | * | 5/1989 | ........... G01N 29/449 |
| WO | WO 2007112872 | * | 10/2007 | ......... G01B 11/2408 |

OTHER PUBLICATIONS

German Search Report issued in German counterpart application No. 10 2016 207 342.7 dated Jan. 13, 2017, with Statement of Relevancy (Eight (8) pages).
Norm DIN EN ISO 4287, "Geometrische Produktspezifikation (GPS)", Jul. 2010 (Twenty Seven (27) pages).

* cited by examiner

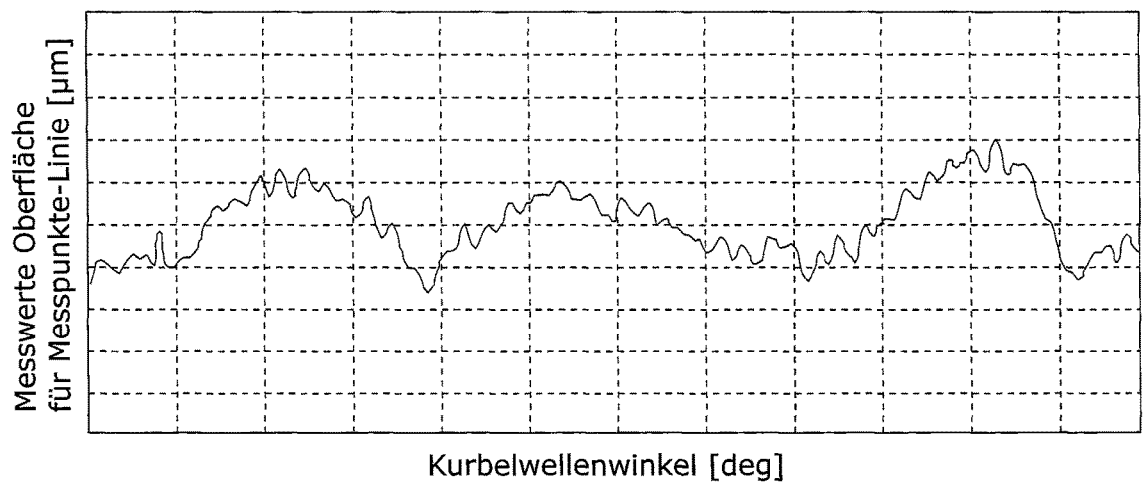
Fig. 1
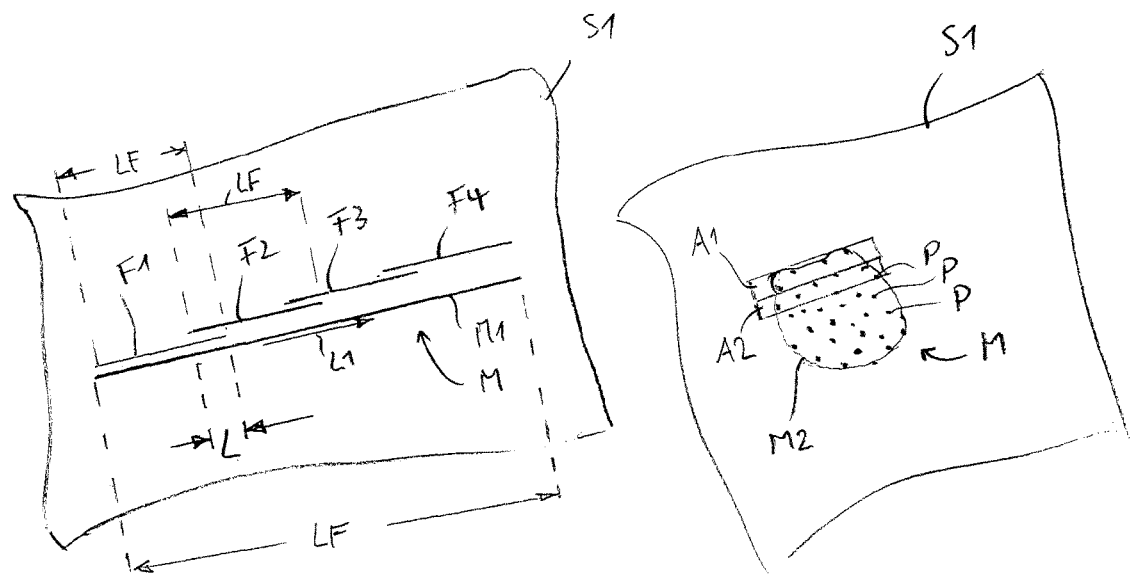
Fig. 2
Fig. 3

METHOD FOR DETERMINING SHAPE DEVIATIONS OF A SURFACE, SURFACE EVALUATION SYSTEM, AND COMPUTER PROGRAM PRODUCT

CROSS REFERENCE TO RELATED APPLICATIONS

This application is a continuation of PCT International Application No. PCT/EP2017/056191, filed Mar. 16, 2017, which claims priority under 35 U.S.C. § 119 from German Patent Application No. 10 2016 207 342.7, filed Apr. 29, 2016, the entire disclosures of which are herein expressly incorporated by reference.

BACKGROUND AND SUMMARY OF THE INVENTION

The invention relates to a method for ascertaining form deviations of a surface, a surface assessment system and a computer program product.

The invention is applicable, in particular, to ascertain form deviations, in particular of the first to fourth order pursuant to DIN 4760. Preferably, the invention is provided for ascertaining waviness.

DE102006015627A1 has disclosed a method for determining waviness by means of a Fourier analysis.

An object of the present invention is to provide a method for ascertaining the waviness of a surface evaluation system and a computer program product, which is easy to implement and which leads to reliable results.

Furthermore, the object of the present invention is to provide a surface assessment system and a computer program product, which has a simple embodiment for carrying out the method according to the invention and which supplies reliable results for ascertaining the waviness of a surface.

The method according to the invention is provided to evaluate the waviness of an actual surface portion of a real actual surface on the basis of measured vertical information items, in each case from measurement points of a group of measurement points situated on the actual surface, wherein the group of measurement points is situated in a measurement point portion of extent, defining the positions of the measurement points, of the actual surface portion. The method uses at least one iteration, in each case with an arrangement of assessment portions, which are distributed in the actual surface portion over the group of the measurement points or distributed over a measurement point portion of extent that defines the positions of the measurement points, at least on a portion-by-portion basis, and which are arranged offset from one another and which, overall, extend over at least one part of the group of measurement points or the measurement point portion of extent, wherein an iteration in each case includes the following steps:

(a) ascertaining a maximum vertical distance for each measurement point of a number of measurement points of each assessment portion, said maximum vertical distance arising as the greatest distance in a prescribed vertical direction between two measurement points in each case, wherein the vertical direction extends transversely to the measurement point portion of extent and the maximum vertical distance in each case emerges between an assessment portion trough and an assessment portion peak, (b) ascertaining an assessment portion grade obtained by a connecting straight line between the assessment portion trough and the assessment portion peak on account of the maximum vertical distance in relation to a distance between the assessment portion trough and the assessment portion peak in the projection of same on an intended surface portion, said intended surface portion representing an ideal model of the actual surface portion, wherein the value pairs of maximum vertical distance and assessment portion grade in each case, respectively ascertained in the at least one iteration for the respective assessment portions of the same, is assigned to a limit criterion in a further method step.

According to a solution according to the invention, the measurement points of the group of measurement points are placed in a row, forming a measurement point line or a measurement track such that the measurement point portion of extent is a measurement track or a measurement point line. Accordingly, the method according to the invention can be provided for assessing the waviness of an actual surface portion of a real actual surface on the basis of measured vertical information items, in each case of measurement points, situated on a measurement track, of the actual surface portion. Accordingly, an embodiment of the method according to the invention uses at least one iteration, in each case with an arrangement of assessment portions on the measurement track or the measurement point line, said assessment portions being arranged offset from one another along the measurement point line and, overall, extending over at least a part of the length of the measurement track. Here, the method has at least one iteration, in each case including the following steps:

(a) ascertaining a maximum vertical distance for each measurement point of a number of measurement points of each assessment portion, said maximum vertical distance arising as the greatest distance in a prescribed vertical direction between two measurement points in each case, wherein the vertical direction extends transversely to the measurement point line and the maximum vertical distance in each case emerges between an assessment portion trough and an assessment portion peak, (b) ascertaining an assessment portion grade obtained by a connecting straight line between the assessment portion trough and the assessment portion peak on account of the maximum vertical distance in relation to a distance between the assessment portion trough and the assessment portion peak in the projection of same on an intended surface portion, said intended surface portion representing an ideal model of the actual surface portion, wherein the value pairs of maximum vertical distance and assessment portion grade in each case, respectively ascertained in the at least one iteration for the respective assessment portions of the same, is assigned to a limit criterion in a further method step.

The assessment portion trough ascertained for a respective assessment portion and the assessment portion peak are two measurement points of the measurement points existing in the respective assessment portion.

An embodiment of the method according to the invention provides for the group of measurement points situated on the actual surface to be a row of measurement points and for the measurement point portion of extent to be a measurement point line, on which the measurement points of the group of measurement points are situated.

An embodiment of the method according to the invention alternatively or additionally provides for the group of measurement points situated on the actual surface to extend in areal fashion over the actual surface and for the measurement point portion of extent to be an areal portion that surrounds the group of measurement points.

An embodiment of the method according to the invention provides for the method to have at least two iterations and the arrangements in different iterations to differ in at least one of the two following properties:

(i) the sizes of the assessment portions of different arrangements of assessment portions on the measurement point portion of extent differ at least in part, (ii) the positions of the assessment portions of different arrangements of assessment portions on the measurement point portion of extent differ at least in part.

Here, in particular, provision can be made for the assessment portions of the respective arrangements of assessment portions to overlap in at least two iterations and the arrangements of the assessment portions to differ by a different amount of overlap of the assessment portions.

An embodiment of the method according to the invention provides for the arrangement of the assessment portions to completely cover the measurement point portion of extent in at least one iteration.

An embodiment of the method according to the invention provides for the assessment portions of an arrangement of assessment portions to have the same portion lengths in a respective iteration.

An embodiment of the method according to the invention provides for the assessment portions of an arrangement of assessment portions of the various iterations to have different sizes.

An embodiment of the method according to the invention provides for the assessment portions of an arrangement of assessment portions that extend at least in part over respectively one measurement point portion of extent to overlap one another, at least in part.

An embodiment of the method according to the invention provides for the intended surface portion to be a cylindrically circumferential surface portion and the measurement point portion of extent to extend over the circumference of the cylindrically circumferential surface portion. Here, provision can be made, in particular, for the arrangement of assessment portions to extend beyond a circumferential length in at least one iteration and the measurement track of an adjoining further circumferential length to be used in the respective portion of an assessment portion that extends beyond a circumferential length.

An embodiment of the method according to the invention provides for the assignment of the value pairs of maximum vertical distance and assessment portion grade in each case to a limit criterion to be brought about graphically by plotting the value pairs in a value field that is spanned by a coordinate axis for assessment portion grades and a coordinate axis for maximum vertical distances, and for the limit criterion to be a limit curve extending in the value field, said limit curve dividing the value field into a side with admissible and a side with inadmissible deviations from the intended surface.

An embodiment of the method according to the invention provides for the limit criterion to be a criterion value and, in particular, a numerical criterion, for a value pair value specification and, in particular, a numerical value to be ascertained in each case for a value pair of an assessment portion, for the assignment of limit criterion and value pairs to be realized by a comparison of the criterion value with the value pair value specification.

A further aspect of the invention provides for a computer program product, embodied to carry out an embodiment of the method according to the invention.

A further aspect of the invention provides for a surface assessment system for assessing a deviation of an actual surface portion of a real actual surface from an intended surface portion, the surface assessment system having a sensor system for ascertaining vertical information items of an actual surface portion, an evaluation apparatus with an evaluation function, which has an interface to the sensor system, wherein the evaluation function carries out at least one iteration, in each case with an arrangement of assessment portions, which are distributed in the actual surface portion over the measurement point portion of extent, at least on a portion-by-portion basis, and which are arranged offset from one another, wherein the evaluation function has a processing function that carries out the following steps:

(a) ascertaining a maximum vertical distance for each measurement point of a number of measurement points of each assessment portion, said maximum vertical distance arising as the greatest distance in a prescribed vertical direction between two measurement points in each case, wherein the vertical direction extends transversely to the measurement point portion of extent and the maximum vertical distance in each case emerges between an assessment portion trough and an assessment portion peak, (b) ascertaining an assessment portion grade obtained by a connecting straight line between the assessment portion trough and the assessment portion peak on account of the maximum vertical distance in relation to a distance between the assessment portion trough and the assessment portion peak in the projection of same on an intended surface portion, said intended surface portion representing an ideal model of the actual surface portion, wherein the value pairs of maximum vertical distance and assessment portion grade in each case, respectively ascertained in the at least one iteration for the respective assessment portions of the same, is assigned to a limit criterion in a further method step.

An embodiment of the surface assessment system according to the invention provides for the processing function to be realized for carrying out an embodiment of the method according to the invention.

In the context of the directional specifications provided herein, which may relate to the profile of a contour line or of a surface or a surface portion or which may relate to a direction of a mechanical component such as an axle or shaft, the expression "along" can mean herein, in particular, that the tangent at the respective contour line or at the respective surface in the extent thereof, according to the directional specification, or the longitudinal extent and the center axis of the mechanical component, for example, locally deviates with an angle of at most 45 degrees and preferably of at most 30 degrees from a reference direction or reference axis, to which the respective directional specification relates.

In the context of the directional specifications provided herein, which may relate to the profile of a contour line or of a surface or a surface portion or which may relate to a direction of a mechanical component such as an axle or shaft, the expression "transverse" can mean herein, in particular, that the tangent at the respective contour line or at the respective surface, in the extent thereof according to the directional specification, or the longitudinal extent and the center axis of the mechanical component, for example, locally deviates with an angle of at least 45 degrees and preferably of at least 60 degrees from a reference direction or reference axis, to which the respective directional specification relates.

The expression "generally" means, in particular, that the relevant feature may be present not only in the embodiment, for which the expression general was used with reference to the respective feature in this context, but that it may also be present in any other embodiment described herewith.

Embodiments of the invention are described below on the basis of the attached figures, in which:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows a diagram for presenting measurement values for vertical information items for a measurement track produced at an actual surface portion, wherein the actual surface portion is a journal surface of a crankshaft in an exemplary manner.

FIG. 2 shows a schematic illustration of an actual surface portion, in which a measurement point portion of extent in the form of a measurement track and assessment portions for applying the method according to the invention are plotted in an exemplary manner, the assessment portions being only arranged transversely offset from the measurement track for improved recognizability, whereas said assessment portions lie on the measurement track according to the method according to the invention.

FIG. 3 shows a schematic illustration of an actual surface portion, in which a measurement point portion of extent in the form of an areal portion and assessment portions for applying the method according to the invention are plotted in an exemplary manner.

DETAILED DESCRIPTION OF THE DRAWINGS

Figure 6:
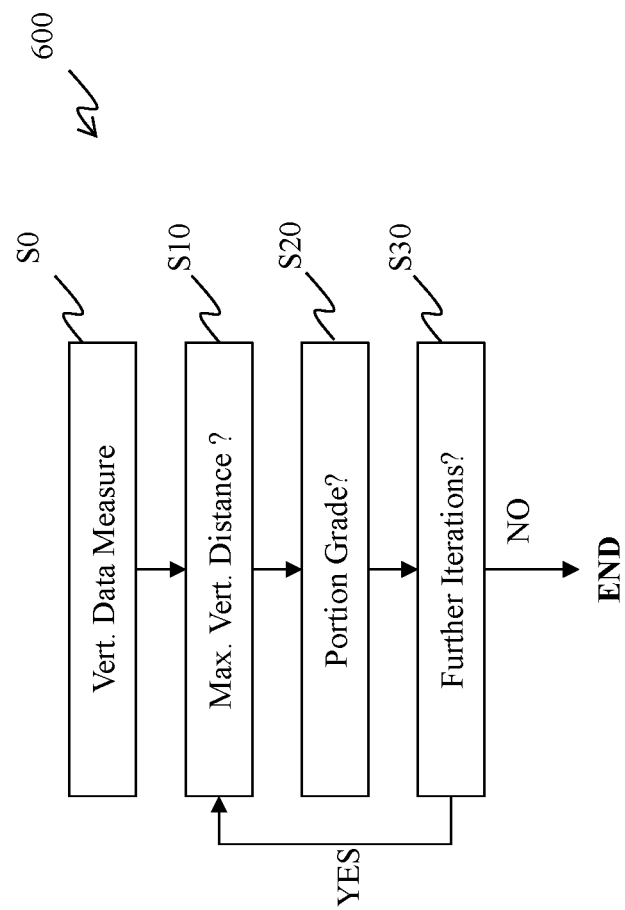
FIG. 6 illustrates aspects of an exemplary method according to at least one embodiment of the invention.

Referring initially to FIG. 6, according to aspects of at least one embodiment of an exemplary method 600, there initially is the measurement of vertical information items and, in particular, of height coordinates of points of an actual surface portion S1 along a measurement track M1, which arises along the longitudinal direction L1 of the actual surface portion S1. (Step S0). Vertical information items include values of points in relation to a predetermined vertical direction, which extends transversely to the measurement track. The vertical information items can also include positional specifications about the position of a respective point on the measurement track.

The vertical information items can be height values on the basis of a coordinate system with a vertical coordinate, the one at the point of the respective measurement point in the vertical direction transverse to the measurement point portion of extent or a local orientation of same. Here, the measurement point portion of extent can also be considered to be a flat pattern on a reference plane such that the vertical direction extends transverse and, in particular, perpendicular to the areal extent of the reference plane.

FIG. 1 shows measurement values or vertical information items of measurement points along the measurement point line or measurement track M1, which is presented in FIG. 2. The vertical direction is preferably prescribed in a suitable manner for respective application of the method according to the invention. In the given case, the vertical direction extends perpendicular to the surface S1. The measurement value diagram of FIG. 1 is defined by the crankshaft angle as the specification for the position of the respective measurement point on the surface S1. The measurement values on the measurement point line are plotted along the ordinate axis such that the plotted curve profile for the surface emerges on the measurement point line.

The actual surface portion S1, for which the application of the method according to the invention is provided, can be a surface portion of a functional surface or control surface, in particular. The surface portion can be part of the functional surface or completely comprise the latter. The functional surface can be part of a machine component. By way of example, the surface portion or the functional surface is a control surface of a first machine component, with which said first machine component acts on a second machine component in order to actuate the latter. By way of example, the functional surface is a journal surface of a crankshaft, on which a connecting rod acts.

The functional surface, and hence the actual surface portion S1, can be differently formed when seen in the longitudinal direction L1. In particular, the actual surface portion S1 can be formed to be plane, i.e., planar, or curved.

In a special embodiment of the invention, the actual surface portion S1 is a circumferential surface and, in particular, a cylindrical lateral surface, with the measurement track extending in the radial direction. An example of this is the journal surface of a crankshaft.

The requirement of an only maximally admissible waviness exists for the respectively affected functional surface, in particular to ensure the function of the functional surface. This can be checked with the aid of the method according to the invention in order to assess the functional capability of such machine components.

The measurement points of a group of measurement points are arranged on the actual surface and they extend over a measurement point portion of extent M, which delimits or defines the positions of the measurement points of the group of measurement points on the actual surface.

According to an embodiment of the method, the measurement points of the group of measurement points lie in a row, said measurement points forming a measurement track, and so the measurement point portion of extent is the measurement track or a measurement point line. Such a measurement point line can have a straight-lined or curved profile. Conversely, a measurement line may also be present, from which discrete measurement points lying thereon can be derived for the purposes of forming the group of measurement points. By way of example, this can be effected according to a random method, according to a prescription of a distance between two measurement points in each case, optionally together with a prescription of a maximum number of measurement points. Here, the assessment portions of an arrangement of assessment portions are arranged in succession along the longitudinal direction L1.

In this case, the assessment portions are preferably embodied as line portions.

The group of measurement points may also have been laid with an areal distribution over the actual surface. In respect of the measurement point portion of extent M, it is possible to define a continuous bounding line which, in respect of the areal extent, delimits the respective outermost points and consequently surrounds the group of the measurement points with an areal distribution. A prescribed direction of extent can be defined for the measurement point portion of extent M in respect of the arrangement of the assessment portions.

In this case, the assessment portions are preferably embodied as areal portions.

Particularly in this context, the expression "distributed" also means that there are gaps between the assessment portions or that said assessment portions are arranged overlapping one another or that said assessment portions completely or partly cover the respective measurement point portion of extent M, that the assessment portions therefore need not completely cover the respective measurement point portion of extent but are able to completely cover the latter.

Measuring a contour curve of the actual surface portion S1 and hence ascertaining vertical information items is effected by means of a measuring head or transducer of a sensor system. Here, the measuring head or the sensor system is moved along an intended measurement path, for the points of which relative or absolute height information items, in particular, are measured as vertical information items. These points are measurement points of the actual surface portion that lie on a measurement track.

In particular, the sensor system can be a distance measurement system that has a measuring head for capturing a distance of the letter from a respective point of the functional surface to be captured. This distance at a respective point of the measurement point line or measurement track M1 is a vertical information item. By way of example, the latter can be related to a coordinate system and thus be transformed for the respective application.

A vertical information item can be ascertained from this distance for each point on the measurement point line or measurement track M1. When measuring the contour curve, this measuring head is driven along an intended measurement path, preferably at a predetermined distance over the actual surface portion S1, and so ascertainment is carried out from the distance of the measuring head or transducer to the surface in the case of the prescribed travel of the sensor.

For the method according to the invention, an arrangement of a plurality of assessment portions is assigned to a measurement point line or measurement track M1. Here, at least one iteration, respectively with an arrangement of assessment portions on the measurement track, is used, said assessment portions being arranged offset from one another along the measurement track and, overall, extending over at least part of the length of the measurement track. The assessment portions of an arrangement of assessment portions can extend completely over a respective measurement track, and so the latter is covered. By contrast, provision can also be made for the assessment portions of an arrangement of assessment portions not to extend completely over a respective measurement track, and so the latter is not completely covered.

FIG. 2 illustrates, in an exemplary manner, an arrangement of assessment portions F1, F2, F3, F4 at a portion of extent M in the form of a measurement point line or measurement track M1, which extends in a longitudinal direction L1. In this embodiment of the arrangement of assessment portions F1, F2, F3, F4, the assessment portions F1, F2, F3, F4 have the same length LF. Moreover, the assessment portions F1, F2, F3, F4 overlap with an overlap length L, which constitutes an overlap measure. This can be represented as a fraction of the length LF.

Referring now to FIG. 6, an iteration in each case includes the following steps:

(a) ascertaining a maximum vertical distance for each measurement point of a number of measurement points of each assessment portion, said maximum vertical distance arising as the greatest distance in a prescribed vertical direction Y between two measurement points in each case, wherein the vertical direction Y extends transversely to the measurement point line or measurement track M1 and the maximum vertical distance in each case emerges between an assessment portion trough P1 and an assessment portion peak P2 (S10), (b) ascertaining an assessment portion grade obtained by a connecting straight line between the assessment portion trough P1 and the assessment portion peak P2 on account of the maximum vertical distance $\Delta Y$ in relation to a distance $\Delta X$ between the assessment portion trough P1 and the assessment portion peak P2 in the projection of same on an intended surface portion, said intended surface portion representing an ideal model of the actual surface portion S1 (S20).

The method uses in at least one iteration (S30), in each case with an arrangement of assessment portions at the measurement point line M1. Here, in general, assessment portions that, in terms of length and number, cover the actual surface portion S1 are preferably provided in an iteration. Independently thereof and preferably in the iterations, one or more of the following parameters of the assessment portions are generally modified:

(1) distance or overlap amount between respectively two adjacent assessment portions, (2) size, i.e. length, of the assessment portions, for example of the assessment portions F1, F2, F3, F4.

The ascertainment of the assessment portion trough P1 and the assessment portion peak P2 and the assessment portion grade is presented in an exemplary manner for an assessment portion F1 in FIG. 3: within the assessment portion F1, there are no two points that have a greater distance from one another in the Y-direction than the assessment portion trough P1 and the assessment portion peak P2.

FIG. 3 shows an actual surface portion S1 with a measurement point portion of extent M in the form of an areal portion M2 and with a group of measurement points P, plotted in an exemplary manner. The group of measurement points that lie on the actual surface extend in areal fashion over the actual surface. Here, the measurement point portion of extent M is an areal portion that surrounds the group of measurement points. Here, it is possible, in particular, to provide—as illustrated—for the boundary line to have a convex curvature as seen from outside of the measurement point portion of extent M.

The method uses in at least one iteration, in each case with an arrangement of assessment portions. Two assessment portions A1, A2 are plotted in FIG. 3 in an exemplary manner. In general, assessment portions that, in terms of design, size and number, cover the actual surface portion S1 are preferably provided in an iteration. Independently thereof and preferably in the iterations, one or more of the following parameters of the assessment portions are generally modified:

(1) distance or overlap amount between respectively two adjacent assessment portions, (2) form of the assessment portions, (3) size of the assessment portions, e.g., length and/or width of the respective assessment portions A1, A2.

Figure 4:
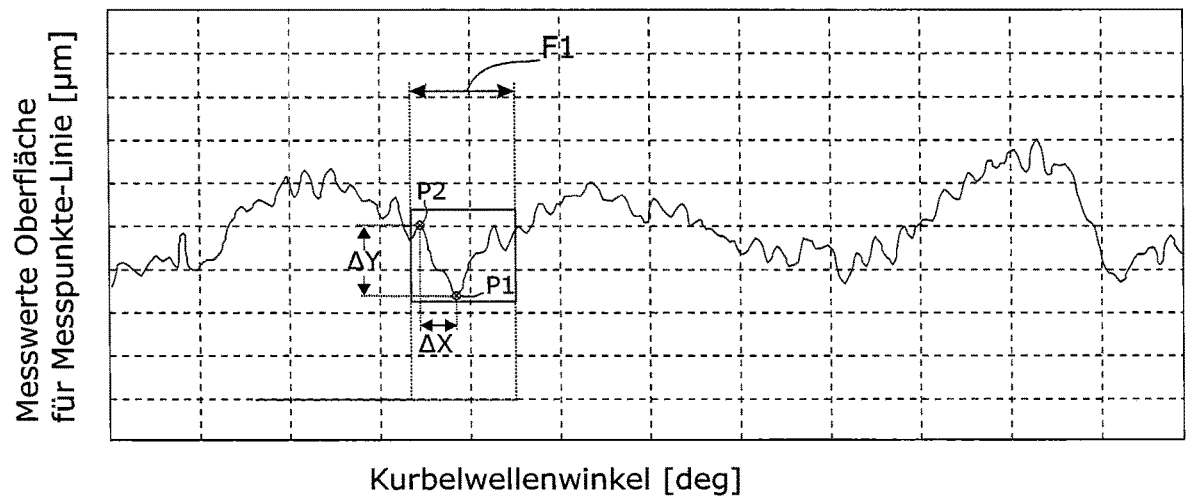
FIG. 4 shows a diagram according to 1, in which an assessment portion trough and an assessment portion peak for an assessment portion and a connecting straight line between the two are plotted for ascertaining an assessment portion grade in an exemplary manner.

FIG. 4 illustrates, in an exemplary manner, the ascertainment of an assessment portion grade on the basis of an assessment portion F1 of FIG. 2 with the maximum vertical distance ΔY, the distance between the assessment portion trough P1 and the assessment portion peak P2. The distance between the assessment portion trough P1 and the assessment portion peak P2 in the projection of same onto an intended surface portion S1 is denoted by "ΔX".

Alternatively, the grade of the connecting straight line between the assessment portion trough and the assessment portion peak can also be determined in step (b) for the assessment portion grade on the basis of the maximum vertical distance in relation to a horizontal distance in the direction of the measurement track.

Consequently, an assessment portion trough and an assessment portion peak, and also an assessment portion grade, should be ascertained from the existing measurement points of the respective assessment portion such that a value pair of maximum vertical distance and assessment portion grade in each case is respectively ascertained for each assessment portion F1, F2, F3, F4.

In the exemplary embodiment illustrated in FIGS. 1 and 4, the intended surface portion S1 is a cylindrically circumferential surface portion. Here, the measurement track M1 extends over the circumference of the cylindrically circumferential surface portion.

Here, according to an embodiment of the method, provision can be made for the arrangement of assessment portions to extend beyond a circumferential length in at least one iteration and the measurement track of an adjoining further circumferential length to be used in the respective portion of an assessment portion that extends beyond a circumferential length.

Additionally, in a case where an assessment portion trough and an assessment portion peak lie at ends or edge points and, in particular, at ends or edge points of an assessment portion lying opposite one another, provision can be made for the respective assessment portion not to be used for the evaluation with a limit criterion.

According to the method according to the invention, wherein the value pairs of maximum vertical distance and assessment portion grade in each case, respectively ascertained in the at least one iteration for the respective assessment portions of the same, is assigned to a limit criterion in a further method step.

Figure 5:
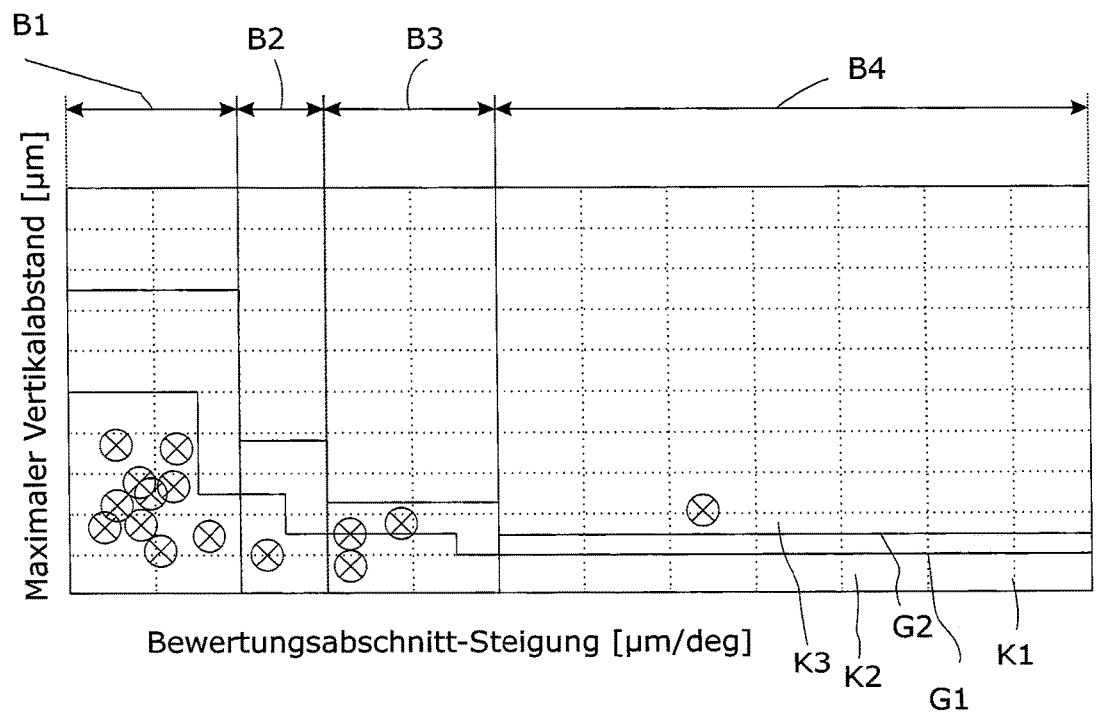
FIG. 5 shows a diagram presenting an assignment of the maximum vertical distance and the assessment portion grade to a limit criterion.

According to an embodiment shown in FIG. 5, this assignment can be realized by virtue of the assignment of the value pairs of maximum vertical distance and assessment portion grade in each case to a limit criterion being brought about graphically by plotting the value pairs in a value field that is spanned by a coordinate axis U for assessment portion grades and a coordinate axis V for maximum vertical distances. Here, the limit criterion is a limit curve G1 extending in the value field, said limit curve dividing the value field into a side with admissible and a side with inadmissible deviations from the intended surface. A second limit curve G2, which, at least in portions, extends at a safety margin from the limit curve G1 and which can be used as a further or additional limit criterion, can also be plotted in the value field. If two limit curves G1, G2 are defined, these define a first limit region K1 situated below the first limit curve G1, a second limit region K2 situated between the first limit curve G1 and the second limit curve G2 and a third limit region K3 situated above the limit curve G2 (FIG. 3). The position of a measurement point in one of the limit regions can be used to ascertain the form deviations of an actual surface.

The evaluation, shown in FIG. 5, with the aid of at least one limit curve can also be realized analytically, i.e., for example, by a software algorithm in a computer program product.

The evaluation of the assignment of the points plotted in the value field to the limit curve G1 can be effected by plotting regions B1, B2, B3, B4 along the assessment portion grade.

As an alternative or in addition thereto, the limit criterion can be a criterion value and, in particular, a numerical criterion, in particular for the maximum admissible vertical distance in each case, which may be dependent on the assessment portion grade.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assessing a form deviation of an actual surface portion of a real actual surface from an intended surface portion on the basis of measured vertical information items, in each case from measurement points of a group of measurement points situated on the actual surface, wherein the group of measurement points is situated in a measurement point portion of extent, defining the positions thereof, of the actual surface portion, wherein the method uses at least one iteration, in each case with an arrangement of assessment portions, which are distributed in the actual surface portion over the measurement point portion of extent, at least on a portion-by-portion basis, and which are situated offset from one another, wherein an iteration in each case includes the following:
    (a) ascertaining a maximum vertical distance for each measurement point of a number of measurement points of each assessment portion, said maximum vertical distance arising as the greatest distance in a prescribed vertical direction between two measurement points in each case, wherein the vertical direction extends transversely to the measurement point portion of extent and the maximum vertical distance in each case emerges between an assessment portion trough and an assessment portion peak,
    (b) ascertaining an assessment portion grade obtained by a connecting straight line between the assessment portion trough and the assessment portion peak on account of the maximum vertical distance in relation to a distance between the assessment portion trough and the assessment portion peak in the projection of same on an intended surface portion, said intended surface portion representing an ideal model of the actual surface portion,
    wherein the value pairs of maximum vertical distance and assessment portion grade in each case, respectively ascertained in the at least one iteration for the respective assessment portions of the same, is assigned to a limit criterion.

2. The method as claimed in claim 1, wherein the group of measurement points situated on the actual surface is a row of measurement points and wherein the measurement point portion of extent is a measurement point line, on which the measurement points of the group of measurement points are situated.

3. The method as claimed in claim 1, wherein the group of measurement points situated on the actual surface extend in areal fashion over the actual surface and wherein the measurement point portion of extent is an areal portion that surrounds the group of measurement points.

4. The method as claimed in claim 1, wherein the method has at least two iterations and the arrangements in different iterations differ in one or more of:
   (i) the sizes of the assessment portions of different arrangements of assessment portions differ at least in part,
   (ii) the positions of the assessment portions of different arrangements of assessment portions on the measurement point portion of extent differ at least in part.

5. The method as claimed in claim 1, wherein the assessment portions of the respective arrangements of assessment portions overlap in at least two iterations and the arrangements of the assessment portions differ by a different amount of overlap of the assessment portions.

6. The method as claimed in claim 1, wherein the arrangement of the assessment portions completely covers the measurement point portion of extent in at least one iteration.

7. The method as claimed in claim 1, wherein the assessment portions of an arrangement of assessment portions have the same portion lengths in a respective iteration.

8. The method as claimed in claim 1, wherein the assessment portions of an arrangement of assessment portions of the various iterations have different sizes.

9. The method as claimed in claim 1, wherein the assessment portions of an arrangement of assessment portions that extend at least in part over respectively one measurement point portion of extent overlap one another, at least in part.

10. The method as claimed in claim 1, wherein the intended surface portion is a cylindrically circumferential surface portion and the measurement point portion of extent extends over the circumference of the cylindrically circumferential surface portion.

11. The method as claimed in claim 1,
    wherein the assignment of the value pairs of maximum vertical distance and assessment portion grade in each case to a limit criterion is brought about graphically by plotting the value pairs in a value field that is spanned by a coordinate axis for assessment portion grades and a coordinate axis for maximum vertical distances, and
    wherein the limit criterion is a limit curve extending in the value field, said limit curve dividing the value field into a side with admissible and a side with inadmissible deviations from the intended surface.

12. The method as claimed in claim 1,
    wherein the limit criterion is a numerical criterion,
    wherein a numerical value is ascertained in each case for a value pair of an assessment portion,
    wherein the assignment of limit criterion and value pairs is realized by a comparison of the numerical criterion with the numerical value.

13. A computer program product comprising non-transitory computer executable program code for assessing a form deviation of an actual surface portion of a real actual surface from an intended surface portion on the basis of measured vertical information items, in each case from measurement points of a group of measurement points situated on the actual surface, wherein the group of measurement points is situated in a measurement point portion of extent, defining the positions thereof, of the actual surface portion, wherein the method uses at least one iteration, in each case with an arrangement of assessment portions, which are distributed in the actual surface portion over the measurement point portion of extent, at least on a portion-by-portion basis, and which are situated offset from one another, wherein an iteration in each case includes the following:
    (a) ascertaining, by the non-transitory computer executable program code, a maximum vertical distance for each measurement point of a number of measurement points of each assessment portion, said maximum vertical distance arising as the greatest distance in a prescribed vertical direction between two measurement points in each case, wherein the vertical direction extends transversely to the measurement point portion of extent and the maximum vertical distance in each case emerges between an assessment portion trough and an assessment portion peak,
    (b) ascertaining, by the non-transitory computer executable program code, an assessment portion grade obtained by a connecting straight line between the assessment portion trough and the assessment portion peak on account of the maximum vertical distance in relation to a distance between the assessment portion trough and the assessment portion peak in the projection of same on an intended surface portion, said intended surface portion representing an ideal model of the actual surface portion,
    wherein the value pairs of maximum vertical distance and assessment portion grade in each case, respectively ascertained in the at least one iteration for the respective assessment portions of the same, is assigned to a limit criterion.

14. A surface assessment system for assessing a form deviation of an actual surface portion of a real actual surface from an intended surface portion, the surface assessment system comprising:
    a sensor system configured to ascertain vertical information items of an actual surface portion; and
    an evaluation apparatus with an evaluation function, which has an interface to the sensor system,
    wherein the evaluation function carries out at least one iteration, in each case with an arrangement of assessment portions, which are distributed in the actual surface portion over the measurement point portion of extent, at least on a portion-by-portion basis, and which are situated offset from one another, wherein the evaluation function is configured to:
    (a) ascertain a maximum vertical distance for each measurement point of a number of measurement points of each assessment portion, said maximum vertical distance arising as the greatest distance in a prescribed vertical direction between two measurement points in each case, wherein the vertical direction extends transversely to the measurement point portion of extent and the maximum vertical distance in each case emerges between an assessment portion trough and an assessment portion peak,
    (b) ascertain an assessment portion grade obtained by a connecting straight line between the assessment portion trough and the assessment portion peak on account of the maximum vertical distance in relation to a distance between the assessment portion trough and the assessment portion peak in the projection of same on an intended surface portion, said intended surface portion representing an ideal model of the actual surface portion,
    wherein the value pairs of maximum vertical distance and assessment portion grade in each case, respectively ascertained in the at least one iteration for the respective assessment portions of the same, is assigned to a limit criterion.

15. The surface assessment system as claimed in claim 14, wherein the group of measurement points situated on the actual surface is a row of measurement points and wherein the measurement point portion of extent is a measurement point line, on which the measurement points of the group of measurement points are situated.

16. The surface assessment system as claimed in claim 14, wherein the group of measurement points situated on the actual surface extend in areal fashion over the actual surface and wherein the measurement point portion of extent is an areal portion that surrounds the group of measurement points.

17. The surface assessment system as claimed in claim 14, wherein there is at least two iterations and the arrangements in different iterations differ in one or more of:
  (i) the sizes of the assessment portions of different arrangements of assessment portions differ at least in part,
  (ii) the positions of the assessment portions of different arrangements of assessment portions on the measurement point portion of extent differ at least in part.

18. The surface assessment system as claimed in claim 14, wherein the assessment portions of the respective arrangements of assessment portions overlap in at least two iterations and the arrangements of the assessment portions differ by a different amount of overlap of the assessment portions.

19. The surface assessment system as claimed in claim 14, wherein the arrangement of the assessment portions completely covers the measurement point portion of extent in at least one iteration.

20. The surface assessment system as claimed in claim 14, wherein the assessment portions of an arrangement of assessment portions have the same portion lengths in a respective iteration.

\* \* \* \* \*